US005748866A

United States Patent [19]

Edgar

[11] Patent Number: 5,748,866

[45] Date of Patent: May 5, 1998

[54] VIRTUAL DISPLAY ADAPTERS USING A DIGITAL SIGNAL PROCESSING TO REFORMAT DIFFERENT VIRTUAL DISPLAYS INTO A COMMON FORMAT AND DISPLAY

[75] Inventor: Albert Durr Edgar, Austin, Tex.

[73] Assignee: International Business Machines Corporation, Armonk, N.Y.

[21] Appl. No.: 269,337

[22] Filed: Jun. 30, 1994

[51] Int. Cl.[6] .................... G06T 3/00

[52] U.S. Cl. .................... 395/128

[58] Field of Search .................... 395/128, 158, 395/834, 344; 345/190, 115, 200

[56] References Cited

U.S. PATENT DOCUMENTS

| | | | |
|---|---|---|---|
| 4,484,302 | 11/1984 | Cason et al. | 395/340 |
| 4,649,479 | 3/1987 | Advani et al. | 395/681 |
| 4,720,705 | 1/1988 | Gupta et al. | 345/20 |
| 4,829,294 | 5/1989 | Iwami et al. | 345/119 |
| 4,833,596 | 5/1989 | Buckland et al. | 395/834 |
| 4,870,406 | 9/1989 | Gupta et al. | 345/199 |
| 4,974,151 | 11/1990 | Advani et al. | 395/828 |
| 5,029,077 | 7/1991 | Fatahalian et al. | 345/112 |
| 5,029,249 | 7/1991 | Seiler et al. | 395/334 X |
| 5,067,071 | 11/1991 | Schanin et al. | 395/293 |
| 5,113,180 | 5/1992 | Gupta et al. | 345/190 |
| 5,113,517 | 5/1992 | Beard et al. | 395/333 X |
| 5,179,639 | 1/1993 | Taaffe | 395/128 |
| 5,233,686 | 8/1993 | Rickenbach et al. | 395/344 |
| 5,263,136 | 11/1993 | DeAguiar et al. | 395/511 |
| 5,274,753 | 12/1993 | Roskowski et al. | 395/135 |
| 5,289,574 | 2/1994 | Sawyer | 395/332 |
| 5,434,592 | 7/1995 | Dinwiddie, Jr. et al. | 345/133 |
| 5,477,242 | 12/1995 | Thompson et al. | 345/132 |
| 5,488,385 | 1/1996 | Singhal et al. | 345/3 |

OTHER PUBLICATIONS

Trussell, DSP Solutions Run The Gamut for Color Systems, IEEE Signal Processing Magazine, Apr. 1993, pp. 8–23.
IC Works, "Zoomdac", W30C516, Feb. 1994, 38 pages.
"A 170–MHz CMOS Pixel Processor for Windowing Graphics", W. N. Schnaitter et al, IEEE Journal of Solid-State Circuits, 0018-9200/92, Mar., 1992, 10 pages.

*Primary Examiner*—Anton W. Fetting
*Attorney, Agent, or Firm*—Robert M. Carwell

[57] ABSTRACT

A universal computer display adapter is provided for a computer having a first memory accessed by applications running on the computer. Each such application acquires a portion of such first memory dedicated to its use. Such dedicated memory serves as a virtual adapter for each respective application whereby the particular application, either during setup or runtime, independently declares its respective virtual adapter to be of a particular desired video display type or mode. A secondary memory is provided to refresh a computer display interconnected to the computer in a conventional manner. Disposed between the first and second memories is a signal processor which may take the form of a digital signal processor (DSP). The processor reformats the image from each such virtual adapter into the common second memory for display. Such reformatting is under control of an operating system specifying position, size, precedence, transparency, and the like of each image window.

53 Claims, 3 Drawing Sheets

VIRTUAL DISPLAY ADAPTERS USING A DIGITAL SIGNAL PROCESSING TO REFORMAT DIFFERENT VIRTUAL DISPLAYS INTO A COMMON FORMAT AND DISPLAY

TECHNICAL FIELD

This invention relates to computer system displays and more particularly to display adapters utilized in conjunction therewith.

BACKGROUND OF THE INVENTION

FIG. 1 illustrates a conventional prior art computer system and provides the necessary background for understanding the subject invention. In FIG. 1, a multitasking computer 10 is provided which may run multiple applications 16–20 under a windowed operating system 22. A representative such computer system might include a PS/2[1] Model 80 Personal Computer employing the OS/2[2] multitasking operating system marketed by the IBM[3] Corporation.

[1]Trademark of International Business Machines Corporation
[2]Trademark of International Business Machines Corporation
[3]Trademark of International Business Machines Corporation The computer system of FIG. 1 further would conventionally include a display adapter 12 containing therewithin memory necessary to refresh a display 14. It has been well known in the art to provide numerous different display adapters dependent upon the characteristics of the particular display being used and the applications' display requirements giving rise to the images to be displayed. Memory is often provided for such windowed systems which is divided into multiple "planes" which overlay one another resulting in display of corresponding multiple windows.

FIG. 1 illustrates a typical 2 plane system. In such a system, one plane 34 might consist of 640×480 bytes, each byte of which is a pointer to a 256 color palette, each byte further consisting of 8 bits. The first such plane would include sufficient memory to handle display of multiple application windows 36, 38.

It will be appreciated that, in accordance with conventional practice, software interfaces 26 and 32 are typically provided. The purpose of such software interfaces, depicted in FIG. 1 collectively at reference numeral 37, was to interface between their various respective applications 16–20 executing on the multitasking computer 10 and the display adapter 12, and more particularly, to interface to the respective memory planes 34, 40, etc. to which each application is mapped. Thus, with respect to applications 1 and 3 (reference numerals 16, 20) corresponding software interfaces 26 and 32 are provided to interface the text, graphics, and images desired to be displayed by the particular application to the memory map of the particular plane 34. In this manner, the display information contained in memory map 34 will ultimately be routed to the display 14 and will appear on the screen thereof. Arrows 46 and 52 are intended to indicate this functional interaction between the software interfaces corresponding to the applications and the display adapter 12, or, more particularly, memory planes 40.

Continuing with FIG. 1, a second plane 40 might be provided such as, for example, a 320×240 pixel array wherein each pixel corresponds to 9 bits with reduced color resolution.

Such a separate array may be used to display full motion video, illustrated in FIG. 2 as arising from application 2 (18). Although a software interface 28 or 30 could possibly handle video, more typically the software interface 30 operates in concert with a hardware interface 24 for fast decompression and conversion. Finally, sequencing and digital-to-analog conversion means, 44, is further provided associated with the display adapter 12 for purposes of reading the various images associated with, and merging the application windows 36, 38, 42, from their associated respective memory planes 34, 40. The sequencer 44 will read from these memory planes at video rates whereupon the D/A converter component of 44 translates them into analog video signals for subsequent appearance on the screen of the display 14.

One of the fundamental problems with such an approach as that depicted in FIG. 1 is that each application 16–20 must follow the correct protocol, including resolution and colorability of the specific display hardware, e.g. the display 14 and display adapter 12. Moreover, each such application must further be responsive to commands from the windowed operating system 22 in order to correctly work within arbitrary sized windows and to retain compatibility with the various transparencies and overlays of other applications. In order to do so, these complex interface software modules 26–32 must be provided for each individual application, and each such application must determine for itself how best to degrade into reduced window sizes. Such software interfaces add considerable complexities to each respective application that is to run in a windowed environment, and moreover such interfaces are both hardware as well as operating system-dependent. Further, such restrictions make it difficult to advance the state of the display art because all changes must be retrofit to modify the interfaces 26 and 32 of existing applications.

The advent of multitasking windows such as those shown in display 14 have proven to be extremely useful for the user. However, the prior art implementations of multitasking windowed systems, such as that depicted in FIG. 1, are fraught with numerous serious problems, only one of which (e.g. dedicated software interfaces) has been briefly touched upon. More broadly, these problems associated with prior art multitasking window systems have included, among others, problems with resource contention for palette colors, font memory, and mode selection; incompatibilities between applications, display adapters, and monitors; and window size complications which must be managed by each individual application.

Historically, in the development of the technology, the aforesaid problems were somewhat manageable with interface software prior to the advent of the explosion the multimedia phenomenon. However such windowed systems were intended to be limited only to display of text and graphics. The emergence of computerized multimedia applications, which are particularly sensitive to the foregoing problems, has exacerbated the severe limitations, inadequacies, and incompatibilities of prior art windowing in multimedia systems. Conventional systems have such crippling constraints associated therewith as to render their applicability to multimedia applications effectively impractical in many instances.

As but one example, a multimedia application typically requires control of the full available palette of the display to produce the best images (which may heretofore have not been required with respect to graphics). However, changing the entire color palette scrambles and renders unusable the color display of the operating system and all other windows currently being displayed on the screen. As another example, an image, which may have been scanned at a 640×480 resolution obviously will not fit in a reduced 600×440 memory space necessary to leave room for the operating system window on a 640×480 pixel physical monitor without either cropping off portions of the image or executing a resizing that usually is too slow and degrades the image. If the image is color mapped, resizing may degrade the image to the point of being unusable. An artistic application designed to run in a 640×480 9 bit YUV window will simply not run on a 360×480 8 bit display card without essentially requiring the scrapping of all artistic efforts and starting over with the original images. As yet another example of the inherent flaws of the prior systems, full motion windows have required use of analog transparency switches with reserved colors to effect such full motion video.

With the foregoing in mind, it is readily apparent that the windowed concept, as architected in the prior art, was designed principally for text and graphics and became woefully inadequate with the advent of modern multimedia system demands. Users have widely embraced the windowed operating systems and are in the process of learning and requiring multimedia extensions thereto, yet the inherent significant weaknesses of such prior windowed systems are only now becoming apparent. A system user for example may need to display high resolution pictures of garments in one window while at the same time working with sales and distribution figures related to the garments in another window. All of the foregoing limitations such as palette incompatibilities, temporary patches and fixes for multimedia, and the like have underscored the urgent need for a successful and cost effective integration of windowing and multimedia technology provided by the subject invention.

Accordingly, it is an object of the invention to provide an inexpensive general purpose display/adapter system for use with computers which is compatible with multimedia software and a range of applications having a variety of different display requirements.

It is a further object of the invention to provide a general purpose computer display adapter system which is contentionless, with each application capable of individually determining respective palettes and modes, as though it alone controlled the entire display.

Yet a further object of the invention was to provide such a system with improved compatibility wherein individual virtual adapter hardware may be determined by each respective application.

Still a further object of the invention was to provide such a system wherein each application could individually select its own virtual resolution.

Another object of the invention was to provide for system independence whereby applications are unaffected by their window size, transparency, and overlay requirements.

Still a further object of the invention is to provide a display system wherein a wide variety of applications could effect visual displays without the need to be written to a specific windowed environment, specific display adapter or mode, and wherein multiple windowed applications could be simultaneously run which each require different display adapters, modes, windowing aspects, and wherein such heterogeneous applications might nevertheless be displayed in overlaid windows as required.

Yet a further object of the invention was to facilitate execution of multimedia applications effectively in windowed environments.

A final object of the invention is to provide a system wherein software applications are unaffected by the resolution and other capabilities of the hardware display technology chosen by the user.

These and other objects are fully met by the subject invention, a more detailed understanding of which may be obtained with reference to the following figures wherein:

SUMMARY OF THE INVENTION

A universal computer display adapter is provided for a computer having a first memory accessed by applications running on the computer. Each such application acquires a portion of such first memory dedicated to its use. Such dedicated memory serves as a virtual adapter for each respective application whereby the particular application, either during setup or runtime, independently declares its respective virtual adapter to be of a particular desired video display type or mode. A secondary memory is provided to refresh a computer display interconnected to the computer in a conventional manner. Disposed between the first and second memories is a signal processor which may take the form of a digital signal processor (DSP). The processor reformats the image from each such virtual adapter into the common second memory for display. Such reformatting is under control of an operating system specifying position, size, precedence, transparency, and the like of each image window.

DETAILED DESCRIPTION OF THE PREFERRED EMBODIMENT

Figure 1:
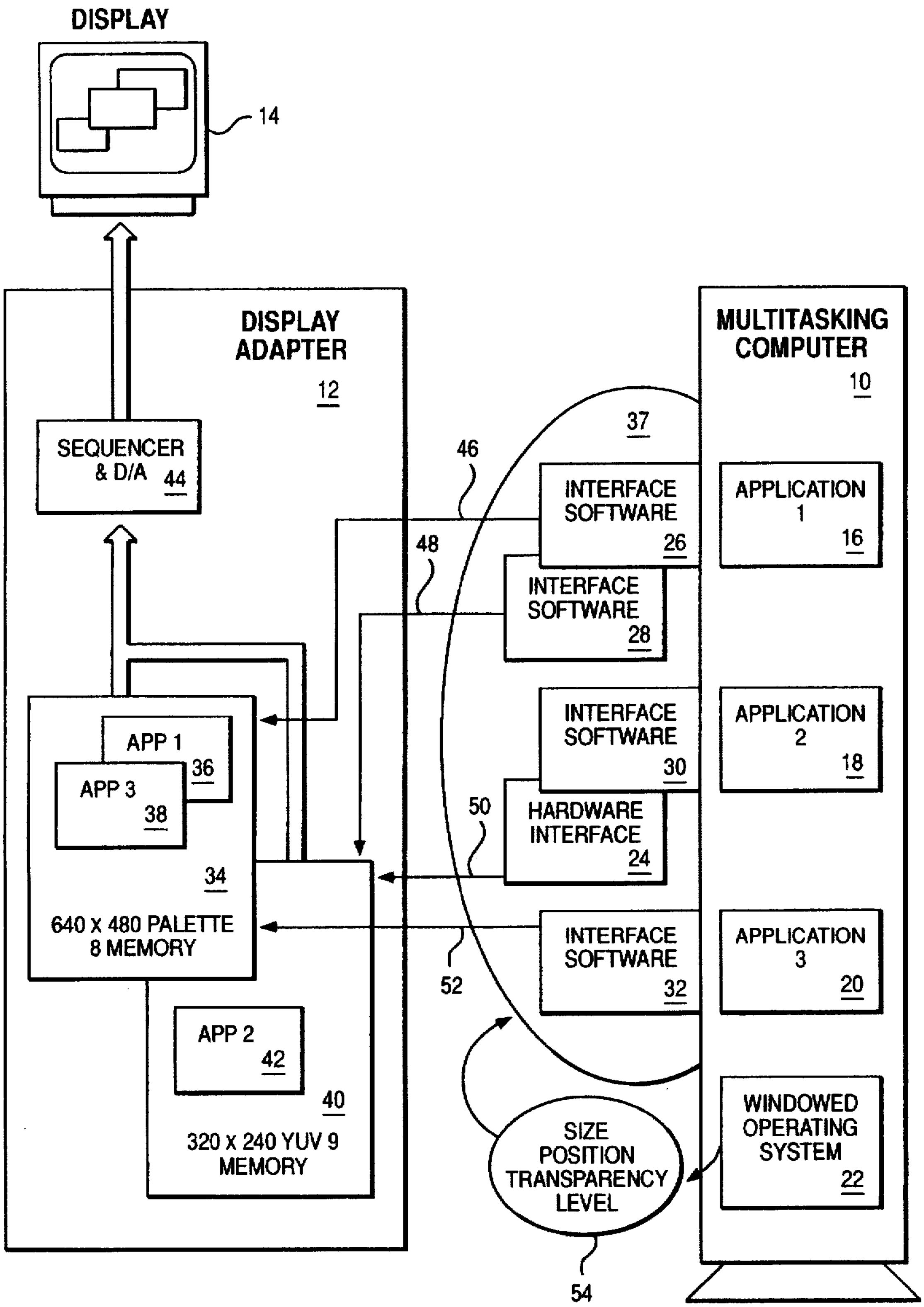
FIG. 1 PRIOR ART
FIG. 1 is a pictorial illustration of a computerized windowing system of the prior art.
Figure 2:
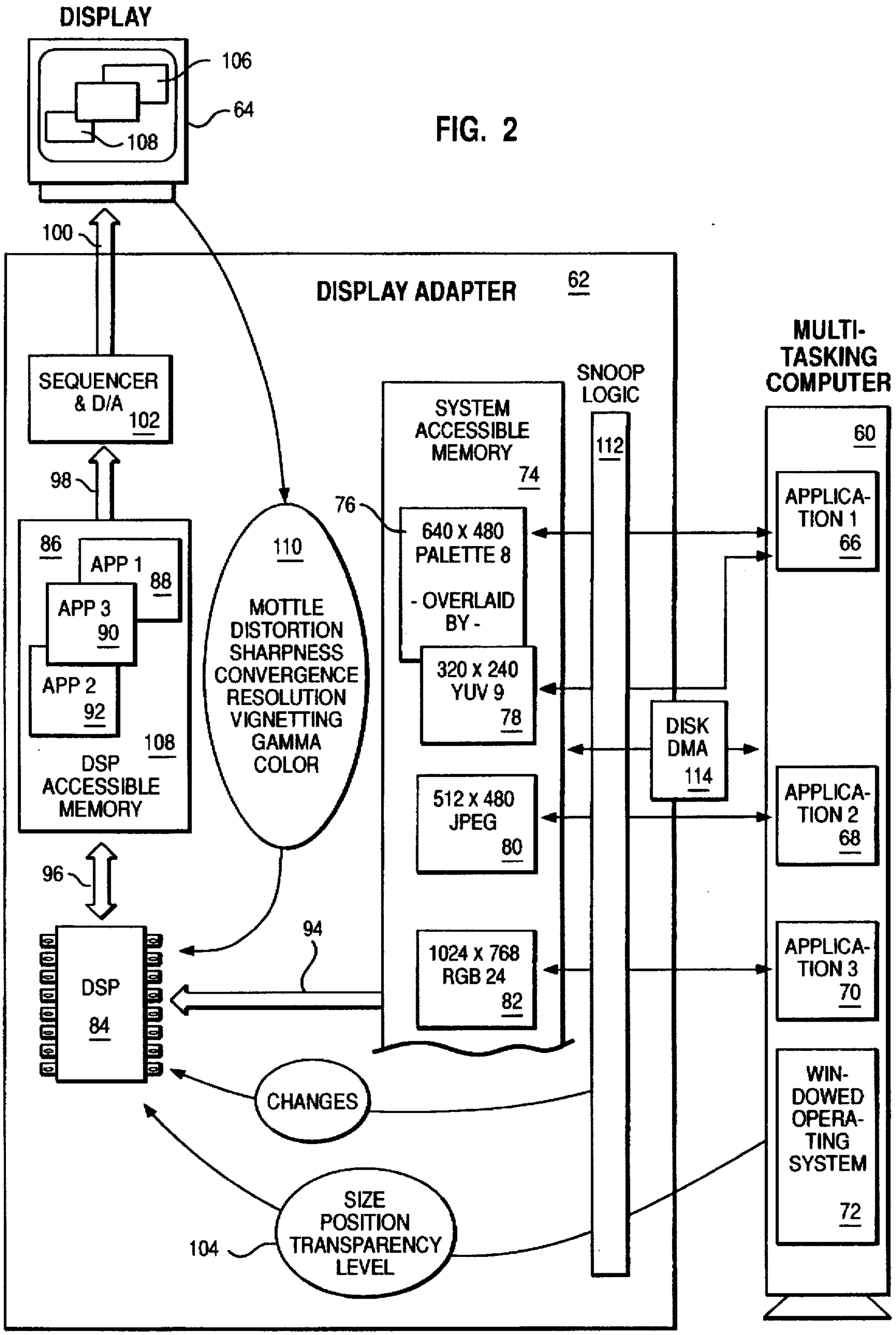
FIG. 2 is a pictorial illustration of a computerized windowing system of the present invention.

Referring now to FIG. 2, a comparison with the prior art system of FIG. 1 indicates several similarities. First, a multitasking computer 60 is provided executing multiple applications 66–70, similar to applications 16–20 of FIG. 1, under control of a windowed operating system 72. In like manner, a display adapter 62 is provided which, when operated in conjunction with the computer 60 and its respective applications under the windowing system, provides output 100 to a display 64 on the screen of which will be displayed the various images 106, 108, etc. as desired in a windowed environment.

Also similar to the prior art system of FIG. 1, a sequencer and D/A converter 102 is provided which receives various stored images resulting from execution of the applications on line 98 from the memory to be described, and outputs them on line 100 to the display 64.

A closer comparison of FIG. 2 to FIG. 1 however, reveals significant differences provided by the invention. First, a system accessible memory 74 is provided. Each application 66–70, in accordance with the invention, assumes control over a portion of such memory 74 entirely for its own functioning. Each such portion of memory will comprise the virtual display adapter for each respective application, whereby the application may independently declare such apportioned memory to represent any adapter type or mode required by the particular application. Thus, a plurality of different such memory requirements associated with respective applications is shown at reference numerals 76, 78, 80, and 82.

More particularly, a first application 66 may require a display type/mode of 640×480 pixel resolution and a color palette managed by 8 bit byte words. This requirement is reflected by the portion of system accessible memory 74 shown at reference numeral 76. This application 66 will further, as an illustration, require yet a different mode of display, namely a 320×240 resolution YUV 9 bit image shown at reference numeral 78. In like manner, a second application, 68, may require a different format such as 512×480 JPEG display mode shown at reference numeral 80, and similarly, a third application 70 might simultaneously require a display adapter having 1024×768 RGB 24 display capability shown at reference numeral 82. As aforesaid, each such application 66–70 will assume control of a respective portion of the system accessible memory 74 associated with the particular type or mode of display required by the respective application. The system accessible memory 74 is thus similar to that of the prior art in that it performs the function of a display memory. However, each application behaves as though it controlled the entire display in a single image plane, the images are layered into separate planes and windows by the processor 84 under control of the operating system 72 as is now described.

Disposed "between" the virtual displays 76–82 and the display memory 108, a processor 84 is provided which serves the purpose of translating image protocols. In a preferred embodiment, this processor will take the form of a digital signal processor (DSP), a representative form of which might be MWAVE or PowerPC by International Business Machines Corporation. The basic function of the processor 84 is thus to receive image protocols from the system accessible memory 74 (such receipt shown functionally by arrow 94 and window area data 104 from the operating system 72), and to translate these image protocols into specified windows within DSP accessible memory 108 which is thereafter output on line 98 to the sequencer 102 and subsequently from the sequencer on line 100 to the display 64. Preferably the protocol of the DSP accessible memory 108 is a superset of all common color protocols, such as 24 bit RGB, so all other images can be translated with a minimum of color loss.

Referring to the memory cache and "snooper" logic functions provided by the subject invention, it may be apparent that a brute force implementation of the translation function provided by the DSP 84 would have such DSP resize and shuffle all of the windows required by the various applications 66–70 in a continuous loop. If such DSP were capable of working at video rates, which many commercially available processors are, any changes from an application to its respective display could appear relatively instantly on the screen of display 64. However, in reality such video DSP's are relatively expensive. Unfortunately, the more inexpensive processors available typically do not operate effectively at video rates.

Accordingly, it is an aspect of the invention to provide for "snooper" logic alerts (shown in FIG. 2 at reference numeral 112. The purpose of such logic is to alert the DSP 84 to display changes originating from the applications 66–70, and from the operating system 72, and where such changes are being written. The DSP 84 then may only need to update the fragments of the screen 106 as the applications update in one frame time. It will be noted that under such conditions, the additional time required for the DSP to operate to effect such changes would normally not even be visible. This communication of the changes originating from the application may be seen indicated functionally at block 104 providing the communication link between the DSP 84 and the windowed operating system 72 (and ultimately the applications at 66–70 operating thereunder) to provide this information regarding window sizing, position changes, and other changes relating to transparency, levels, and the like.

Still referring to FIG. 2, the system accessible memory 74 and the display adapter 62 may, in one embodiment, be sufficiently large to hold the entire image such as image 80 of each respective application. However, in practice, providing for so much memory accessible at video rates is expensive. Moreover, provision for so much memory would nevertheless still become a problem for users who may at times open large numbers of multiple windows simultaneously. Most of the time newly written image data is utilized only once. It is therefore yet an additional feature of the invention to provide the display adapter 62 with a cache-to-disk controller (shown in FIG. 2 at reference numeral 114 whereby the principle of complete compatibility is observed. In this manner, even very low-end adapters with small amounts of memory may then accommodate large numbers of simultaneously opened windows with compromised response time.

Turning now to the window sizing and order of precedence aspects of the invention, it will be recalled that in accordance with the prior art, each application 66–70 typically was responsible for managing and coordinating its respective window sizing and precedence. However, in accordance with the invention, the operating system 72 specifies this (as shown at reference numeral 104) to the DSP 84 which alone effects the necessary resizing, overlaying of windows and the like. Text, graphics, and images may accordingly vary in their respective window with essentially infinite size resolution, thereby enabling true windowing capability with image applications and particularly for such image applications not written for windows in accordance with the invention's teachings. The operating system 72 thus makes available to the DSP 84 window size information, 104, whereby the application may, if desired, vary font size, image complexity, or virtual resolution. However, the application itself is under no constraint to provide any such information. Because the DSP 84 attends to control of overlay and transparency, the hereinbefore noted problems of reserved colors and analog transparency switching, (currently used by many systems for full motion video windows) are thereby obviated. In this manner, as a feature of the invention, the display hardware resolution is decoupled from the application resolution except, of course, for the fact that a higher resolution display is a clearer window onto a theoretically infinite resolution desktop.

Smooth operation of the foregoing concepts rest upon quality of a resizing algorithm such as that depicted in U.S. patent application Ser. No. 08/295,318 (IBM Docket No. AT9-92-151), U.S. Pat. No. 5,608,538, Mar. 4, 1997, entitled "Scan Line Queuing for High Performance Image Correction", may be used to effect the foregoing and is incorporated herein by reference. A mathematically ideal system, such as that in the referenced application, first would convert the input brightness number of each pixel associated with an image to lumens by squaring the magnitude thereof. The system would thereafter preferably perform a resizing by convolving with a "sinc" function and would thereafter reconvert back from lumens according to the particular gamma characteristics of the physical display 64 which is involved. The sinc convolution avoids moire patterns, and the resizing in lumens-space will avoid the dotted-line effect on graphics. If the lumen-sinc resize executes too slowly for a given implementation of the invention (such as might be expected with an implementation involving an entry-level DSP), the resizing may first employ a faster executing but lower image quality algorithm, only then later touching up new areas.

Still referring to FIG. 2, more detail will now be provided relative to the sequencer and D/A functionality 102 provided in the invention. The sequencer will access and read the DSP accessible memory 108 at video rates, as shown by arrow 98, and thereafter assemble such memory for output 100 and subsequent display on the display 64. Although such reading of memory 108 may be fixed for a particular monitor or display 64, in a preferred embodiment a linked structure would effect such accessing. Employing such a linked structure, the DSP 84 would set up its own color clocks and unique syncs, and thereafter perform the proper color encoding to produce broadcast grade NTSC, PAL, or SECAM, color-under for direct head recording, or digital VCR format, thereby directly bypassing analog color encoding sections of a video display adapter 102. Moreover, such DSP 108 might further, as desired, even be adapted to handle other protocols and monitors such as the IBM 8514 display protocol, other graphics monitors, HDTV temporal and spatial color diffusion required by FLCD flat displays, and the like. In like manner, the adapter 62 may desirably, in some applications, even further be provided with additional memory 108 and sequencer 102 capability to operate multiple displays simultaneously. This, for example, may be desirable for recording of NTSC, or HDTV video while simultaneously displaying in a window on a computer monitor, or merely to obtain additional windows and to move them between displays which may or may not have matched resolutions and refresh rates.

Continuing with FIG. 2, it is to be expected that display registration problems 110 may manifest themselves from time to time such as geometric distortions, color misconvergence, display brightness faults such as mottle, vignetting, gamma, color, sharpness, resolution, and other problems. Such defaults may be measured at manufacturing or calibration and communicated to the DSP 108. During aforementioned resizing conducted by the DSP 84 from the information conveyed from system accessible memory 74 on line 94, registration correction may be accounted for and corrected by the DSP 84. Similarly, during the reconverting step wherein values of lumens are reconverted back to voltage levels as previously described, these aforementioned brightness faults may in like manner be accounted for and corrected by the DSP 84.

It will be readily apparent that such correction for registration and brightness deficiencies with the DSP will provide substantial increase in image quality. Moreover, in thereby freeing the hardware in the system of FIG. 2 from the necessity for providing precision hardware convergence and linearity, display costs to the consumer may be significantly reduced, e.g. a lesser quality display 64 having a correspondingly lower cost may be provided without sacrificing displayed image quality.

As a specific example, liquid crystal color displays (LCD's) commonly alternate from left to right, red-green-blue-red-green-blue in a sequential pattern across the screen. One red-green-blue triplet is mapped to an image pixel, however it may be seen that because the red, green, and blue components of the one pixel are not concentric, rather in a sequential pattern, this displaces the net red image one-third pixel left of green, and the net blue image, one-third pixel right. This is apparent on most LCD displays as a red fringe on the left of white lines and a blue fringe on the right. The DSP can correct for this misconvergence as a part of resizing, thereby increasing the clarity of color LCD displays.

From the foregoing it will be apparent that the system of the invention facilitates software compatibility of very low cost, poorly aligned displays with even the most advanced multimedia software. Obviously the more expensive displays will, with this adapter, provide a clearer window displaying more details and allowing more applications to be clearly visible simultaneously. Similarly, even though the invention provides for execution of multiple applications with widely varying display requirements which would otherwise require a variety of adapters, more costly and capable adapters would of course provide the extra memory and DSP speed necessary to handle an even greater number of windows, and more sophisticated windows, faster than the low end counterparts. By analogy, 35 millimeter film may load equally as well in a $20 camera or a $2,000 camera. In accordance with the invention, however, wide varieties of software could essentially display on virtually any adapter and monitor although a significant market obviously would nevertheless remain for the full range of display quality.

In one embodiment, the virtual adapter hardware requested by a given application may be in need of a full motion digital video card. In such an implementation of the invention, the DSP 84 would obviously require adequate power or the image would be degraded from full motion video. As an example, such a DSP 84 in this application might require a DSP such as the serial instruction, parallel processing, V3 microchip provided by the Intel Corporation or a DSP of similar power, or an array of DSP processors under control of an operating system to divide the translation task among them.

Figure 3:
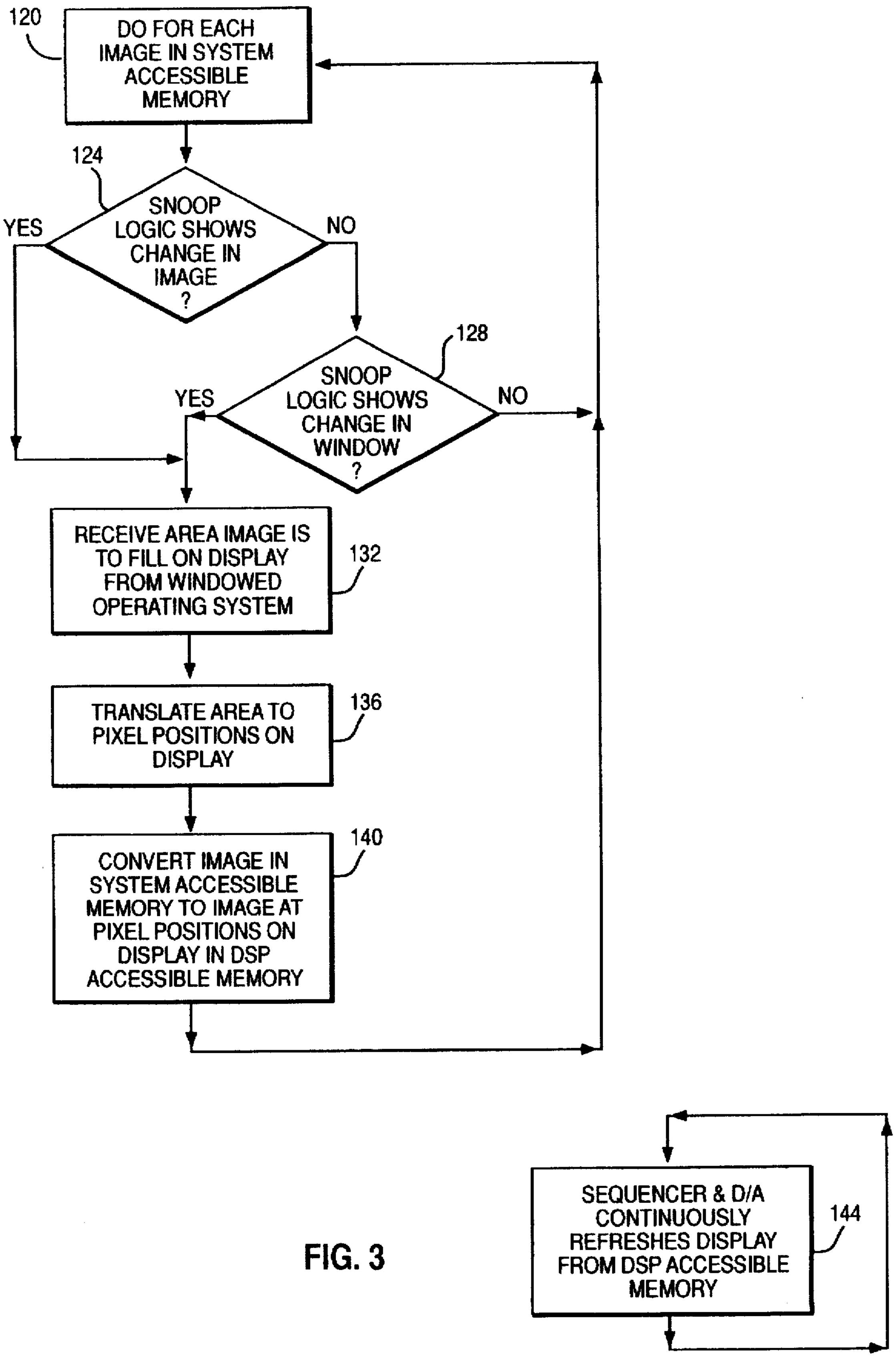
FIG. 3 is a flow diagram of a program operating in conjunction with the system of FIG. 2 to effect the general purpose computer display adapter system and method of the invention.

Turning now to FIG. 3, an algorithm executes the essential functions of this invention.

Block 120 steps through all images in the system accessible memory. For each of those particular images, the following steps are performed:

Block 124 tests if data has been written to the particular image since the last time refreshed from block 120. Such a change is signaled when the snoop logic detects the system writing the address range in the system accessible memory that contains the particular image. Block 128 tests if the topology of the window containing the particular image has been changed by the operating system since the last refresh. Such changes may include movement, change in size, and being covered or uncovered by other windows. If either the image or its window has changed since the last refresh, the image is reconverted, else the system returns to block 120 to proceed with the next image. The selection process in blocks 124 and 128 could be made more sophisticated to detect the areas of change in an image. For example, a window may be partly uncovered or a word changed in text. With this refinement, only specific areas of an image would need to be refreshed.

Having determined an image has changed, block 132 receives from the operating system the area on the output display, and hence the area in the DSP accessible memory to receive the converted image. To be resolution independent, this information may be received in fractional screen width, for example the image may be specified as starting 20% of the screen width across, 10% down, and ending at 40% across and 25% down. Because the DSP must convert pixels to pixels, block 136 converts this location to physical pixels on the output display, and hence physical memory locations in the DSP accessible memory. Following the numerical example above, with a 640×480 display, the window would start at pixel 128 across and 48 down, and end at pixel 256 across and 120 down. Similarly, other indicators would specify overlay and transparency in a manner common to windowed operating systems today.

Finally, block 140 performs the actual conversion of the image from the protocol in the system accessible memory to the protocol and location in the DSP accessible memory. The DSP might, for example, use a lookup table to translate a color mapped image to true color, then use a resize algorithm to remap the true color pixels from the system accessible memory resolution to the DSP accessible memory resolution and location.

While the preceding function is performed by the DSP, the sequencer and D/A are continuously reading the DSP accessible memory and presenting the contained image to the output display in block 144.

From the foregoing, it will be noted that the subject invention solves the serious problems hereinbefore experienced in prior art systems with respect to contention, compatibility, sizing, and application independence. More particularly, with respect to each feature, in accordance with the invention, multiple simultaneously executing applications may now individually select their own palette and mode as required, may further select their own respective virtual adapter hardware and virtual resolution, and moreover such applications may now thus be unaffected by their window sizes, transparency, and overlays. In short, virtually any application may now be displayable with the system thus disclosed and would not be burdened with the requirement that it be written for a windowed environment. Nor would such applications need to be written for specific display adapters or modes. In such a multi-windowed system, one window might accordingly contain a display of a relatively older application intended to function with a monochrome monitor, partially overlaid by yet another application which has assumed that it has full screen color graphics display capability allocated (such as that provided by, for example, a RISC System/6000[4] system marketed by the IBM Corporation), and wherein such screen may even be partially overlaid by yet another application performing displays of multimedia images in a smaller window with custom palettes.

[4]Trademark of International Business Machines Corporation

Thus, facility has thereby been provided to enable applications with widely varying image display requirements to operate successfully without custom software or hardware, including multimedia operating inside windows and full motion windows, all such functions being provided in an extremely cost-effective and trouble free environment.

I claim:

1. A method for use in a multitasking computer system operating a windowed operating system executing multiple applications comprising allocating different portions of a first memory for use by respective different ones of said applications as virtual display adapters each of said display adapters corresponding to a different video type or mode;

storing a representation of an image in each of said portions of said first memory, each said image corresponding to a different one of said applications;

reformatting under control of said operating system, each said image into a common second memory said reformatting including reformatting position data corresponding to an image window of at least one said applications and reformatting size data corresponding to an image window of at least one said application;

and wherein said reformatting size data for a given said image comprised of a plurality of pixels comprises A) converting brightness of each of said pixels to a value representative of lumens;

B) convolving said converted brightness with a sinc convolution function to generate corresponding convolved values; and C) reconverting said convolved values from said values representative of lumens to values representative of signal output to said display as a function of gamma characteristics of said display; and generating a display corresponding to the contents of said second memory.

2. The method of claim 1 wherein said reformatting comprises reformatting precedence data corresponding to an image window of at least one said application.

3. The method of claim 1 wherein said reformatting comprises reformatting transparency data corresponding to an image window of at least one said application.

4. The method of claim 1 wherein said allocating of one of said different portions of said first memory is independent of allocating a different one of said different portions of said first memory.

5. The method of claim 1 wherein said reformatting comprises translating image protocols each associated with a different said representation of an image; and storing said image protocols in said second memory.

6. The method of claim 1 wherein said reformatting is by digital signal processing.

7. The method of claim 6 further comprising detecting changes impending in said each image arising from execution of a respective one of said applications which update an image fragment;

communicating said detected changes to said digital signal processing; and updating, with said digital signal processing, in response to said communicated detected changes, a fragment of said display corresponding to each said image fragment.

8. The method of claim 6 wherein said operating system communicates window size information to said digital signal processing.

9. The method of claim 6 wherein said operating system controls said digital signal processing to vary font size of at least one said image.

10. The method of claim 6 wherein said operating system controls said digital signal processing to vary image complexity of at least one said image.

11. The method of claim 6 wherein said operating system controls said digital signal processing to vary virtual resolution of at least one said image.

12. The method of claim 6 further including conveying, with said operating system, display registration error to a digital signal processing routine; and compensating for said registration error with said digital signal processing routine during said reformatting size data.

13. The method of claim 12 wherein said registration error comprises geometric distortion.

14. The method of claim 12 wherein said registration error comprises color misconvergence.

15. The method of claim 14 wherein said color misconvergence arises from the pixel colors of a display lying in a sequential pattern.

16. The method of claim 6 further comprising communicating, with said digital signal processing, display brightness error to a digital signal processing routine; and compensating for said display brightness error during said reformatting.

17. The method of claim 16 wherein said brightness error is mottle.

18. The method of claim 16 wherein said brightness error is vignetting.

19. The method of claim 16 wherein said brightness error is gamma error.

20. The method of claim 16 wherein said brightness error is color error.

21. The method of claim 1 wherein said first memory is less than the memory required to simultaneously store each said image.

22. The method of claim 1 wherein said first memory is cached virtual memory.

23. The method of claim 1 wherein said reformatting comprises reformatting with a linked structure.

24. The method of claim 1 wherein said reformatting into a common second memory includes reformatting to two portions of said second memory with respective different protocols.

25. The method of claim 24 wherein one of said protocols is a video protocol.

26. An apparatus for use in a multitasking computer system operating a windowed operating system executing multiple applications comprising a first memory;

a second memory;

means for allocating different portions of said first memory for use by respective different ones of said applications as virtual display adapters each of said display adapters being of a different video type or mode;

means for storing a representation of an image in each of said portions of said first memory, each said image corresponding to a different one of said applications;

means for reformatting each said image into said second memory under control of said operating system, said means for reformatting including means for reformatting position data corresponding to an image window of at least one said applications and further including means for reformatting size data corresponding to an image window of at least one said application, said means for reformatting size data for a given said image comprised of a plurality of pixels comprising:

A) means for converting brightness of each of said pixels to lumens;

B) means for convolving said converted brightness with a sinc convolution function to generate corresponding values; and C) means for reconverting said values from lumens to voltage as a function of gamma characteristics of said display; and means for generating a display corresponding to the contents of said second memory.

27. The apparatus of claim 26 wherein said means for reformatting comprises means for reformatting precedence data corresponding to an image window of at least one said application.

28. The apparatus of claim 26 wherein said means for reformatting comprises means for reformatting transparency data corresponding to an image window of at least one said application.

29. The apparatus of claim 26 further including means for allocating a different one of said different portions of said first memory, and wherein said means for allocating of one of said different portions of said first memory is independent of said means for allocating a different one of said different portions of said first memory.

30. The apparatus of claim 26 wherein said means for reformatting comprises means for translating image protocols each associated with a different said representation of an image; and means for storing said image protocols in said second memory.

31. The apparatus of claim 26 wherein said means for reformatting comprises a digital signal processor.

32. The apparatus of claim 31 further comprising means for detecting changes impending in said each image arising from execution of a respective one of said applications which update an image fragment;

means for communicating said detected changes to said digital signal processor; and means for updating, with said digital signal processor, in response to said communicated detected changes, a fragment of said display corresponding to each said image fragment.

33. The apparatus of claim 31 wherein said operating system includes communication means for communicating window size information to said digital signal processor.

34. The apparatus of claim 31 wherein said operating system includes control means for controlling said digital signal processor to vary font size of at least one said image.

35. The apparatus of claim 31 wherein said operating system includes control means for controlling said digital signal processor to vary image complexity of at least one said image.

36. The apparatus of claim 31 wherein said operating system includes control means for controlling said digital signal processor to vary virtual resolution of at least one said image.

37. The apparatus of claim 31 further including means for conveying, with said operating system, display registration error to a digital signal processing routine; and means for compensating for said registration errors with said digital signal processing routine during said reformatting size data.

38. The apparatus of claim 37 wherein said registration error comprises geometric distortion.

39. The apparatus of claim 38 wherein said registration error comprises color misconvergence.

40. The apparatus of claim 39 wherein said color misconvergence arises from pixel colors of said means for generating a display lying in a sequential pattern.

41. The apparatus of claim 26 wherein said first memory is less than the memory required to simultaneously store each said image.

42. The apparatus of claim 26 wherein said first memory is cached virtual memory.

43. The apparatus of claim 26 wherein said means for reformatting comprises means for reformatting with a linked structure.

44. The apparatus of claim 26 wherein said means for reformatting into a common second memory includes means for reformatting to two portions of said second memory with respective different protocols.

45. The apparatus of claim 44 wherein one of said protocols is a video protocol.

46. The apparatus of claim 26 further comprising means for communicating with said operating system display brightness errors to a digital signal processing routine; and means for compensating for said display brightness errors with said digital signal processing routine during said reconverting said values from lumens to voltage.

47. The apparatus of claim 46 wherein said brightness error is mottle.

48. The apparatus of claim 46 wherein said brightness error is vignetting.

49. The apparatus of claim 46 wherein said brightness error is gamma error.

50. The apparatus of claim 46 wherein said brightness error is color error.

51. A method for use in a multitasking computer system operating a windowed operating system executing multiple applications comprising:

allocating different portions of a first memory for use by respective different ones of said applications as virtual display adapters, each of said display adapters corresponding to a different video type or mode;

storing a representation of an image in each of said portions of said first memory, each said image corresponding to a different one of said applications;

reformatting by digital signal processing under control of said operating system, each said image into a common second memory, said reformatting including reformatting position data corresponding to an image window of at least one said applications and reformatting size data corresponding to an image window of at least one said application;

conveying, with said operating system, display registration error to a digital signal processing routine;

compensating for said registration error with said digital signal processing routine during said reformatting size data; and generating a display corresponding to the contents of said second memory.

52. A method for use in a multitasking computer system operating a windowed operating system executing multiple applications comprising allocating different portions of a first memory for use by respective different ones of said applications as virtual display adapters, each of said display adapters corresponding to a different video type or mode;

storing a representation of an image in each of said portions of said first memory, each said image corresponding to a different one of said applications;

reformatting by digital signal processing under control of said operating system, each said image into a common second memory, said reformatting including reformatting position data corresponding to an image window of at least one said applications and reformatting size data corresponding to an image window of at least one said application;

communicating, with said digital signal processing, display brightness error to a digital signal processing routine;

compensating for said display brightness error during said reformatting; and generating a display corresponding to the contents of said memory.

53. An apparatus for use in a multitasking computer system operating a windowed operating system executing multiple applications comprising:

a first memory;

a second memory;

means for allocating different portions of said first memory for use by respective different ones of said applications as virtual display adapters, each of said display adapters being of a different video type or mode;

means for storing a representation of an image in each of said portions of said memory, each said image corresponding to a different one of said applications;

digital signal processor means for reformatting each said image into said second memory;

means for generating a display corresponding to the contents of said second memory;

means for conveying, with said operating system, display registration error to a digital signal processing routine; and means for compensating for said registration errors with said digital signal processing routine during said reformatting size data.

* * * * *